United States Patent [19]

Ramesh et al.

[11] Patent Number: 4,737,722

[45] Date of Patent: Apr. 12, 1988

[54] SERIAL PORT SYNCHRONIZER

[75] Inventors: Nallepilli S. Ramesh, San Jose; Subramanian Narasimhan, Santa Clara, both of Calif.

[73] Assignee: Advanced Micro Devices, Inc., Sunnyvale, Calif.

[21] Appl. No.: 759,623

[22] Filed: Jul. 26, 1985

[51] Int. Cl.[4] ............... H03K 1/17; H03K 17/00; H03K 5/13

[52] U.S. Cl. ....................... 328/63; 328/72; 328/155; 377/47; 377/52; 307/269

[58] Field of Search ............ 328/155, 63, 72, 109, 328/179; 377/47, 52, 84; 307/529, 269, 262

[56] References Cited

U.S. PATENT DOCUMENTS

| | | | |
|---|---|---|---|
| 4,095,186 | 6/1978 | Vesel | 328/155 |
| 4,600,845 | 7/1986 | McKenna et al. | 328/155 |
| 4,646,004 | 2/1987 | Brandt et al. | 328/155 |

Primary Examiner—Stanley D. Miller
Assistant Examiner—Timothy P. Callahan
Attorney, Agent, or Firm—Patrick T. King; Kenneth B. Salomon

[57] ABSTRACT

Method and apparatus for rapid, low-jitter acquisition of a clock signal at a serial communication port. In the absence of communication over the port, and during clock acquisition, a free-running clock is generated for local communication. Following clock acquisition by a circuit which performs coarse phase adjustments, a simple logic network generates refined phase adjustment signals which drive a variable, nominal divide-by-32, counter so that the clock generated thereby is smoothly brought into synchronization with the acquired clock in one bit increments. In a typical application, at most 48 bit periods at the port are required to synchronize the clock, with a clock phase jitter of less than 1.1%.

10 Claims, 5 Drawing Sheets

SERIAL PORT SYNCHRONIZER

CROSS-REFERENCE TO RELATED CO-PENDING APPLICATIONS

Related, copending applications of particular interest to this invention are U.S. application Ser. No. 759,622, filed July 26,1985, on behalf of Alan T. Clark, Hadi Ibrahim and Arthur F. Lange, entitled "Digital Subscriber Controller," and U.S. Ser. No. 759,624, filed July 26, 1985, on behalf of Alan T. Clark and Arthur F. Lange, entitled "Programmable Data-Routing Multiplexer," both assigned to the assignee of the instant invention, whose descriptions are incorporated herein.

FIELD OF THE INVENTION

This invention relates to apparatus and method to generate a synchronizing clock signal for time-division multiplexed signals and, more particularly, to rapid, low-jitter synchronization of a clock signal in the presence of time-division multiplexed signals and to generation of a free-running clock signal otherwise.

BACKGROUND OF THE INVENTION

Subscriber-side telephone terminal equipment (TE) can be connected to a telephone network at a so-called subscriber ("S") interface. Over the "S" interface, time-division multiplexed voice and data can be serially communicated. The subscriber's TE is synchronized to the data received at the "S" interface to provide frame alignment and to provide synchronization of each bit position within a channel's time-slot. Such synchronization must occur rapidly and should minimize discontinuities in the generation of a synchronization timing (clock) signal, "jitter", during start-up to avoid information loss and error generation.

It is desirable to afford a free-running clock signal even when there is no traffic over the "S" interface, such as when the line is "dead", when sychronization with the received data has been lost, or for purely local communications and yet automatically enter into synchronization with any traffic at the "S" interface.

Known in the prior art are complex synchronization schemes employing phase-locked-loop circuitry which can achieve rapid synchronization with data at the "S" interface in a relatively "coarse" fashion; multiple-bit adjustments in the phase of the generated clock signal occur during clock recovery. Such discontinuities can produce erratic behavior in the circuits receiving the generated clock signals and may require lenghty waiting periods for the clock to stabilize during which no useful function is performed by these circuits.

Accordingly there is a need for a serial port synchronizer which refines the clock signal recovered by the coarser methods so as to operate in a free-running mode during periods of no activity or clock-acquisition at the serial port and performs a smooth, relatively jitter-free, synchronization with the acquired clock once it has been locked by the coarser method.

SUMMARY OF THE INVENTION

A clock generator of the instant invention, suitable for synchronizing a serial port of a subscriber-side controller is provided. The serial port synchronizer generates a free-running clock at a nominal 192 KHz when there is no activity at a serial "S" interface and generates a clock synchronized with information at the "S" interface when the interface is activated. The generator can rapidly acquire the synchronized clock within a maximum of 48 bit periods of the signal received at the interface (250 microseconds) with a maximum of 160 nanosecond phase jitter introduced for every three generated clock cycles. This ensures that the resulting jitter is les than 1.1% on the serial port during acquisition.

A logic network consisting of a pair of flip-flops and a pair of AND gates samples activity at the "S" interface and generates phase adjustment signals upon detection of line activity. These phase adjustment signals are used by a variable-modulo counter to generate the synchronized clock signal, if line activity has been detected. In the absence of phase adjustment signals, either because of no line activity or because of synchronization with such activity, the variable-modulo counter operates in a nominal, divide-by-32, mode to generate the synchronized, or free-running, clock, respectively. Upon reception of a phase adjustment signal indicating that the generated clock is advanced (respectively, retarded) with respect to the received clock, the variable-modulo counter operates in a slow, divide-by-33, (respectively, fast, divide-by-31) mode. In this manner, a one thirty-second of a period adjustment in the period of the generated clock is affected.

A modulo-three counter is employed within a feedback path of the phase-adjustment logic network so that at most one such phase adjustment is made for every three generated clock periods. In this way, the jitter is held to one thirty-second of a clock period (160 nanoseconds) for every three clock periods (15.6 microseconds), i.e., less than 1.1%.

Sampling of the received clock is performed in a very simple manner so that the relative phase relationship to the generated clock can be determined solely with reference to two samples, one during the 15th time interval of the variable-modulo counter and one during its 16th time interval.

The serial port synchronizer of the instant invention thus provides a free-running clock signal isolated from a received clock when the line is dead or during phase acquisition and a synchronized clock signal after a rapid and low jitter phase acquisition. This provides a clock for both local communications and for the time-division multiplexed communications to a telephone network over an "S" interface.

DESCRIPTION OF THE PREFERRED EMBODIMENT

Figure 1:
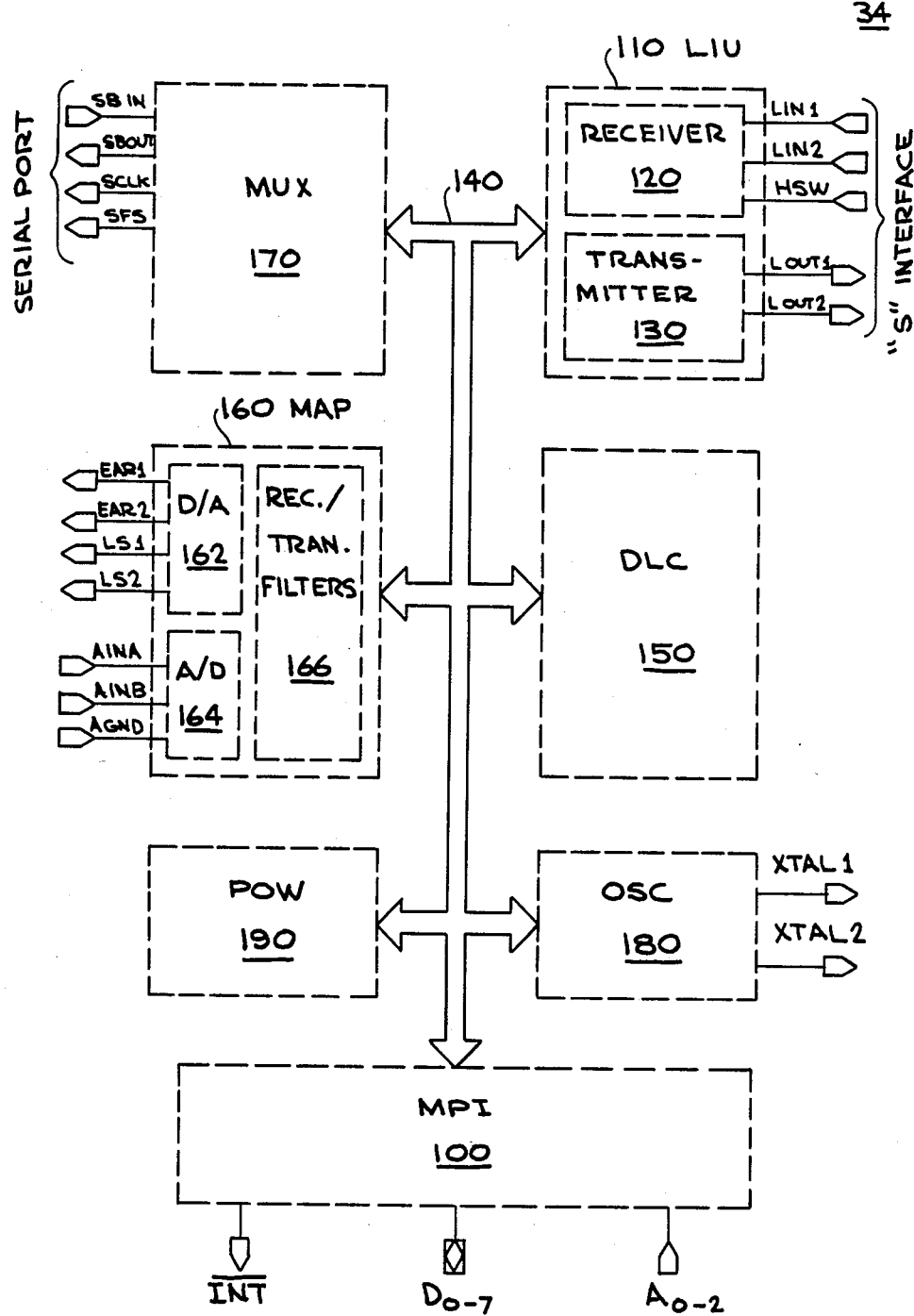
FIG. 1 is a functional block diagram of a digital subscriber controller (DSC) employing the serial port synchronizer of the instant invention.

The serial port synchronizer of the present invention will be illustrated in an exemplary application within a digital subscriber controller (DSC) 34 consisting of seven functional blocks, as illustrated in FIG. 1. The DSC provides digital subscriber access to a telephone network. The DSC is compatible with the Committe Consultative International Telephon and Telegraphic (CCITT) I-series recommendations at reference points "S" and "T". Accordingly, the user of the DSC according to the present invention may design terminal equipment (TE) which conforms to international standards.

The DSC 34 is the subject of a related copending application Ser. No. 759,622, filed July 26, 1985, on behalf of Alan T. Clark, Hadi Ibrahim and Arthur F. Lange, entitled "Digital Subscriber Controller", and assigned to the assignee of the instant application. A detailed description of the DSC 34 of FIG. 1, other than the programmable data-routing multiplexer shown thereon as MUX 170 is contained in the above-referenced copending application. This related, copending application is hereby incorporated by reference.

With reference to FIG. 1, DSC 34 provides a 192 kbs full-duplex digital path for bit-streams received via an isolation transformer (not shown) on a four-wire "S" interface at terminals LIN1 and LIN2, and transmitted on the four-wire interface from terminals LOUT1 and LOUT2. The DSC separates the received bit-stream into B1 and B2 channels (each 64 kbs), and D channel (16 kbs). The B channels are routed to different ones of the functional blocks illustrated in FIG. 1 under user control via the multiplexer 170. The multiplexer 170 is the subject of a related copending application Ser. No. 759,624, filed July 26, 1985, on behalf of Alan T. Clark and Arthur F. Lange, entitled "Programmable Data-Routing Multiplexer", and assigned to the assignee of the instant application. This related, copending application is hereby incorporated by reference. The D-channel is partially processed at the Level 2 in the DSC 34 and passed via a microprocessor interface (MPI) 100 to a programmable microprocessor (not shown) for additional processing. The DSC 34 supports both of the two major CCITT recommendations, "point-to-point" and "point-to-multipoint" subscriber configurations, to meet both PBX and public applications.

With reference to FIG. 1, the DSC 34 includes a line interface unit (LIU) 110, connected to the terminals LIN1 and LIN2, which contains a receiver section 120 and a transmitter section 130. The receiver section 120 consists of a receiver filter, a digital phase-lock loop (DPLL) for clock recovery, two slicers for detecting high marks and low marks of the incoming bit-stream frames, and a frame recovery circuit for frame synchronization.

Receiver 120 converts the incoming pseudo-ternary encoded bit stream into binary before conducting it to the other blocks of the DSC 34, illustrated in FIG. 1, via a bus 140. The receiver 110 also performs D-channel access protocol to resolve potential contention when the DSC 34 is operating in the "point-to-multipoint" configuration.

The transmitter section 130 consists of a binary-to-pseudo-ternary encoder and a line driver which receives signals on the bus 140 and causes an outgoing bit stream to be generated therefrom at the LOUT1 and LOUT2 terminals of the DSC 34. This outgoing bit stream is as specified in the CCITT recommendations for the "S" interface.

The LIU 110 conforms to the CCITT recommendations for level 1 activation and deactivation on the "S" interface. This is achieved by transmitting, and decoding, the standard CCITT "Info" signals. The LIU 110 is also responsive to a signal on a hook switch (HSW) terminal of the DSC 34. The HSW terminal receives a signal indicative of the off-hook or on-hook condition of the handset.

The DSC 34 also includes a data link controller (DLC) 150 connected to the bus 140 which partially processes the 16-kbs D-channel received via the LIU 110. The partial processing of the layer 2 of the protocol includes flag detection and generation, zero deletion and insertion, frame check sequency processing for error detection, and some addressing capability. The external microprocessor 38 initializes the DLC 150 and performs higher level protocol processing. When the DSC 34 is in the receive mode, D-channel data is conducted from the LIU 110 to the DSC 150, via bus 140, and then to the microprocessor interface (MPI) 100 for transmission from a set of eight data terminals (D0, D1, D2, D3, D4, D5, D6, and D7) of the DSC 34 to the external microprocessor. When the DSC is in the transmit mode, D-channel data is conducted from MPI 100 to the LIU 110 via DLC 150 for transmission on the D-channel over the "S" interface.

A main audio processor (MAP) 160 contained within the DSC 34 performs digital-to-analog (D/A) conversion within a D/A section 162 and analog-to-digital (A/D) conversion within a A/D section 164 and digital filtering of the signals present in the DLC 34 in a receive/transmit filters section 166. Analog audio signals can be applied to MAP portion of the DSC 34 at earphone terminals (EAR1 and EAR2), two general analog inputs (AINA, AINB, AGND) and analog voice signals are generated by the MAP portion at loudspeaker terminals (LS1 and LS2). The MAP 160 transmits and receives digital signals on the bus 140 carrying digital representations of audio signals received at the EAR1, EAR2, AINA, or AINB terminal or to be generated at the LS1 and LS2 terminals, respectively.

The data-routing multiplexer (MUX) 170 is externally programmable via the external microprocessor and, in response, controls the multiplexed bit-streams on the B1 and B2 channels which are received and transmitted to external peripheral devices from the DSC 34 at a serial-B input (SBIN) terminal of the DSC 34 and a serial-B output (SBOUT) terminal of the DSC 34, respectively. The MUX 170 can be programmed to establish a variety of different signal paths via the bus 140 having source and destinations, including: the SBIN terminals, the SBOUT terminal, the MPI 100, the LIU 110, and the MAP 160. The MUX 170 of FIG. 1 selectively routes the 64 kbs B1 and B2 channels among the MPI 100, the LIU 110, and the MAP 160, with internal logical channels designated thereon as Ba (for the MAP), Bb and Bc (for the MPI), Bd, Be and Bf (for the B-serial port), and B1 and B2 (for the LIU). The D-channel data is routed to the DLC 150 directly from the LIU 110. The B-serial port of MUX 170 also includes a serial clock (SCLK) signal line and a serial frame synchronization (SFS) signal line. Hence, the B-serial port of MUX 170 consists of the four signal lines: SBIN, SBOUT, SCLK and SFS, shown in FIG. 1.

Figure 3A:
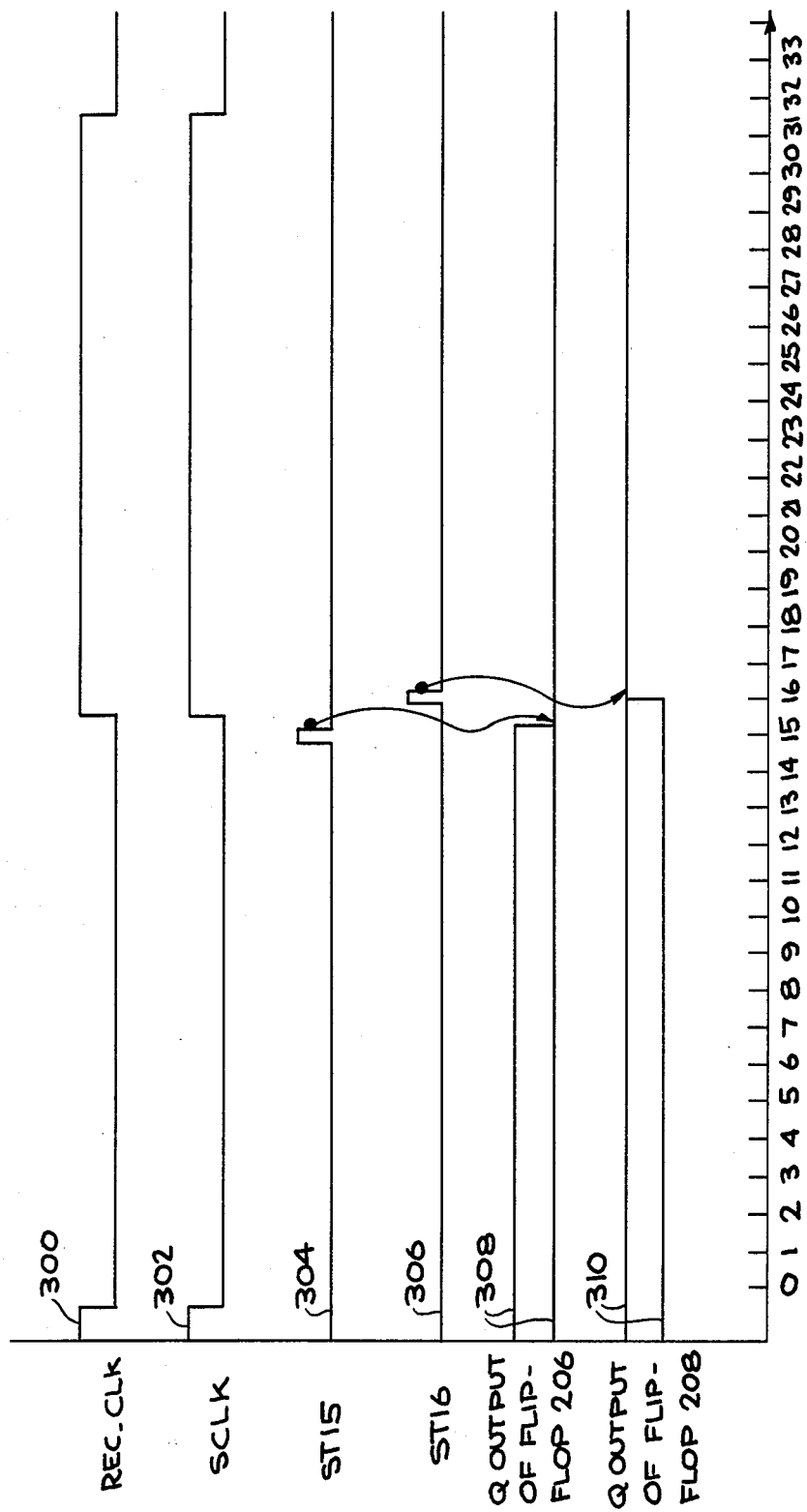
FIG. 3A is a timing diagram showing an in-phase relationship between the received clock and the serial port clock.

The serial clock provides a nominal 192 KHz synchronizing clock which is synchronous to the information at the "S" interface when synchronized activity is detected at the "S" interface and free-running at the nominal 192 KHz frequency at all other times. The serial frame synchronization pulse is used to provide frame synchronization at the B-serial port. The timing signals on the SCLK and SFS signal lines will be described in further detail, below, in connection with B-serial port timing diagram of unitary FIG. 3.

Familiarity with the CCITT Series I.430 recommendations is useful to an understanding of the present invention. These recommendations are accordingly hereby incorporated herein. Of particular interest to the present invention is the "Activation/Deactivation layer 1 finite state matrix at terminal side" shown as TABLE 3/I.430 at page 180 of the CCITT "D-Series Recommendations" Temporary Document 18-E.

Figure 2:
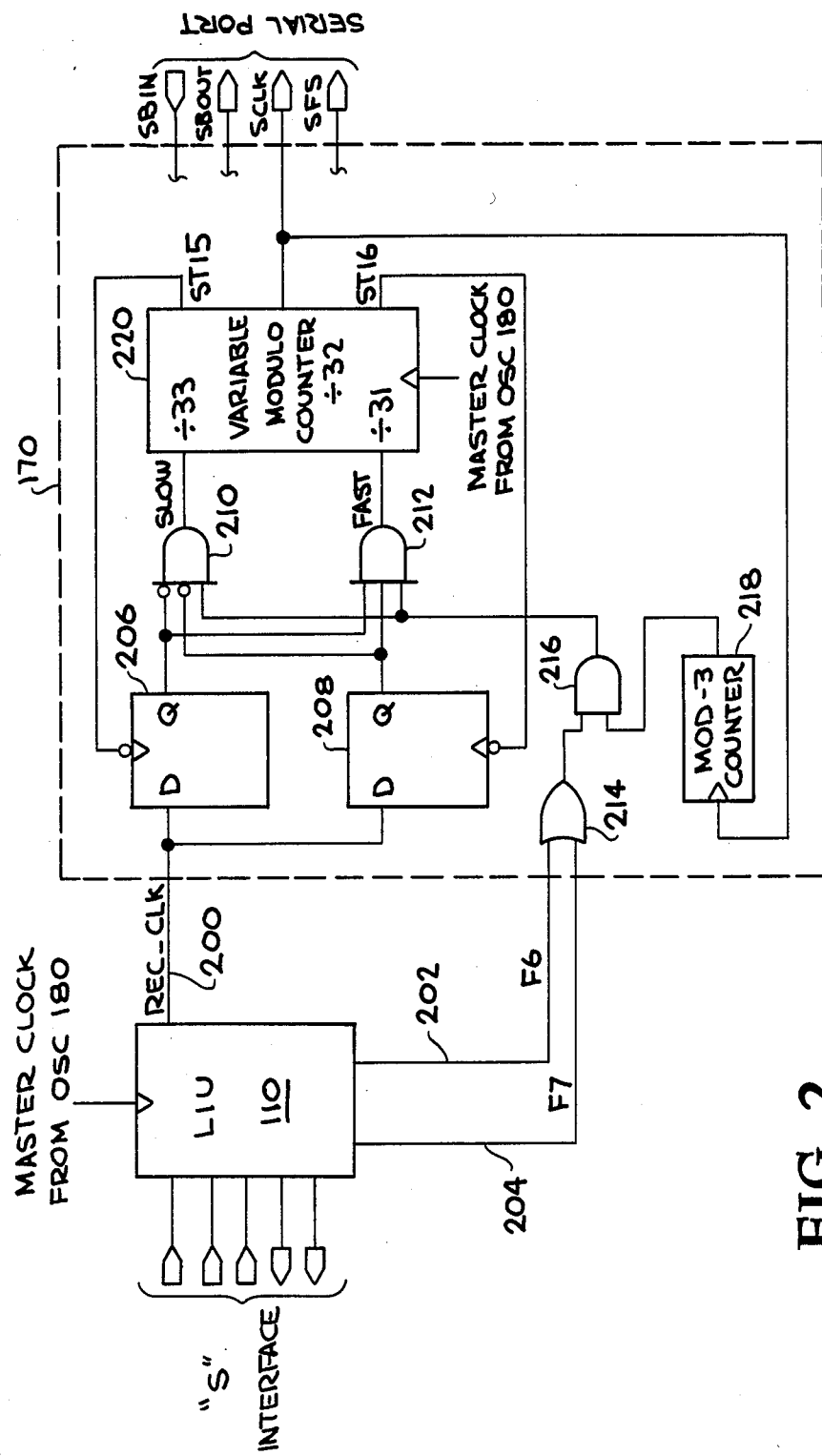
FIG. 2 is a logic diagram of the serial port synchronizer of the instant invention.

A logic diagram of the serial port synchronizer of the instant invention is shown in FIG. 2. As shown, the serial port synchronizer is in the "serial input/output controller" portion of the MUX 170. The remaining portions of the MUX 170 are described in the related copending application entitled "Programmable Data-Routing Multiplexer". Their description therein is hereby incorporated by reference.

A recovered received clock (REC_CLK) signal generated by the reeiver section 120 of LIU 110 is conducted on a signal line 200 to the serial port synchronizer portion of MUX 170. The received clock signal is generated by the receiver section 120 of LIU 110 and has a nominal frequency of 192 KHz, with a 50% duty cycle. During the detection of synchronous activity at the "S" interface, (States "F6" or "F7") of TABLE 3/I.430) the REC_CLK signal is phase locked to the information at the "S" interface, with a maximum jitter rate of +/−160 nanoseconds during every 250 microsecond frame received at the "S" interface. In the unsynchronized and the deactivated states (other than F6 and F7), the REC_CLK signal can be coarsely adjusted by circuitry internal to the LIU 110 for rapid phase acquisition.

The receiver section 120 of the LIU 110 also generates on signal lines 202 and 204, respectively, signals indicative of the detection of synchronization with information at the "S" interface ("F6") and detection of activity of the "S" interface ("F7").

The signal line 200 conducts the REC_CLK signal to an input terminal of a D-type flip-flop 206 and an input terminal of a second D-type flip-flop 208 of the serial port synchronizer. The "Q" output of flip-flop 206 is connected to a complemented input terminal of an AND gate 210 and to a true input of another AND gate 212. The "Q" output terminal of flip-flop 208 is connected to a second complemented input terminal of AND gate 210 and to a second true input terminal of AND gate 212.

The F6 and F7 signals generated by LIU 110 are conducted on signal lines 202 and 204, respectively, to the input terminals of an OR gate 214. The output terminal of OR gate 214 is connected to an input terminal of a third AND gate 216. The output terminal of AND gate 216 is connected to a true input terminal of AND gate 210 and to a third true input terminal of AND gate 212. The output terminal of a modulo-three counter 218 is connected to a second input terminal of AND gate 216.

AND gate 210 generates at its output terminal a SLOW signal which is conducted to a divide-by-33 input terminal of a variable-modulo (nominal divide-by-32) counter 220. AND gate 212 generates at its output terminal a FAST signal which is conducted to a divide-by-31 input terminal of variable-modulo counter 220. Variable-modulo counter 220 also receives at a clock input a 6.144 MHz master clock (MCLK) signal generated by a clock internal to the OSC 180 portion of the DSC 34. The MCLK signal is also conducted to the LIU 110 portion of the DSC 34.

The variable-modulo counter 220 can operate in one of three modes depending on the inputs at its divide-by-31 and divide-by-33 terminals. If both inputs are LOW, then the counter 220 functions in its nominal divide-by-32 mode. If the input at the divide-by-33 terminal, respectively, the divide-by-31 terminal, is HIGH, then the counter 220 operates in a divide-by-33, respectively, divide-by-31, mode. The resulting signal generated at the output terminal of counter 220 is the SCLK signal used to synchronize the time-multiplexed information at the serial port.

The SCLK signal is conducted to a clock input of the modulo-three counter 218 to ensure that only one phase adjustment occurs in any three consecutive periods of the SCLK signal.

A state 15 (ST15) signal at a second output terminal of variable-modulo coutner 220 is conducted to an active LOW clock input terminal of flip-flop 206. The ST15 signal is generated by counter 220 during the fifteenth time interval of its nominal 32 time intervals. A state 16 (ST16) signal at a third output terminal of counter 220 is conducted to an active LOW clock input terminal of flip-flop 208. The ST16 signal is generated during the sixteenth time interval of the nominal 32 time intervals of counter 22.

With reference to the timing diagrams of unitary FIG. 3, in the unsynchronized and no-activity states (other than states F6 and F7), the signals on lines 202 and 204 will be LOW and the resulting signal generated from them by OR gate 214 will be a LOW. Hence, the signal generated by AND gate 216 will be a LOW since one of its input terminals is a LOW. Accordingly, the resulting signal at the time input terminals of AND gates 210 and 212 connected to the output terminal of AND gate 216 will be a LOW and the signals at the output terminals of AND gates 210 and 212 will be LOW. In this manner, the SLOW and FAST input signals to variable-modulo counter 220 are held LOW and the counter operates in the nominal divide-by-32 mode. Thereby providing a free-running 192 KHz SCLK signal at the serial port. Accordingly, any jitter in the REC_CLK signal occurring during clock acquisition or resynchronization does not appear in the SCLK signal.

On attaining and verifying synchronization of the information at the "S" interface, LIU 110 generates either an F6 or F7 state signal and thus the signal at the output terminal of OR gate 214 is HIGH. The REC_CLK signal generated by LIU 110 is applied to flip-flops 206 and 208 and sampled during time interval 15 by the flip-flop 206 and during time interval 16 by the flip-flop 208 since these flip-flops receive as clock signals the ST15 and ST16 signals, respectively, from counter 220.

If the SLCK signal at the output terminal of counter 220 is in the proper phase relationship to the REC_CLK signal, flip-flop 206 would generate a LOW and flip-flop 208 would generate a HIGH. This situation is illustrated in the timing diagram of FIG. 3A in which the REC_CLK signal waveform 300 and the SCLK signal waveform 302 are shown plotted against the thirty-two time intervals of the variable-modulo counter 220 numbered 0, 1, 2, ..., 31. As shown, during time interval 15, the flip-flop 206 receives the ST15 clock signal shown in FIG. 3A waveform 304 from counter 220 and samples the REC_CLK signal, which is LOW. Hence, the flip-flop 206 generates a LOW beginning with time interval 16, as shown in waveform 308. Similarly, flip-flop 208 receives the ST16 clock signal waveform 306 from counter 220 during time interval 16, and samples the REC_CLK signal, which is a HIGH. Hence, the flip-flop 208 generates a HIGH beginning with time interval 17, as shown in waveform 310. Since flip-flops 206 and 208 therefore generate complementary signals in the case of a proper phase relationship between the REC_CLK and the SCLK signals, both of the AND gates 210 and 212 will generate a LOW, and accordingly, neither the divide-by-33 nor the divide-by-31 inputs to counter 220 will be activated, and thus it will operate in its nominal mode.

Figure 3B:
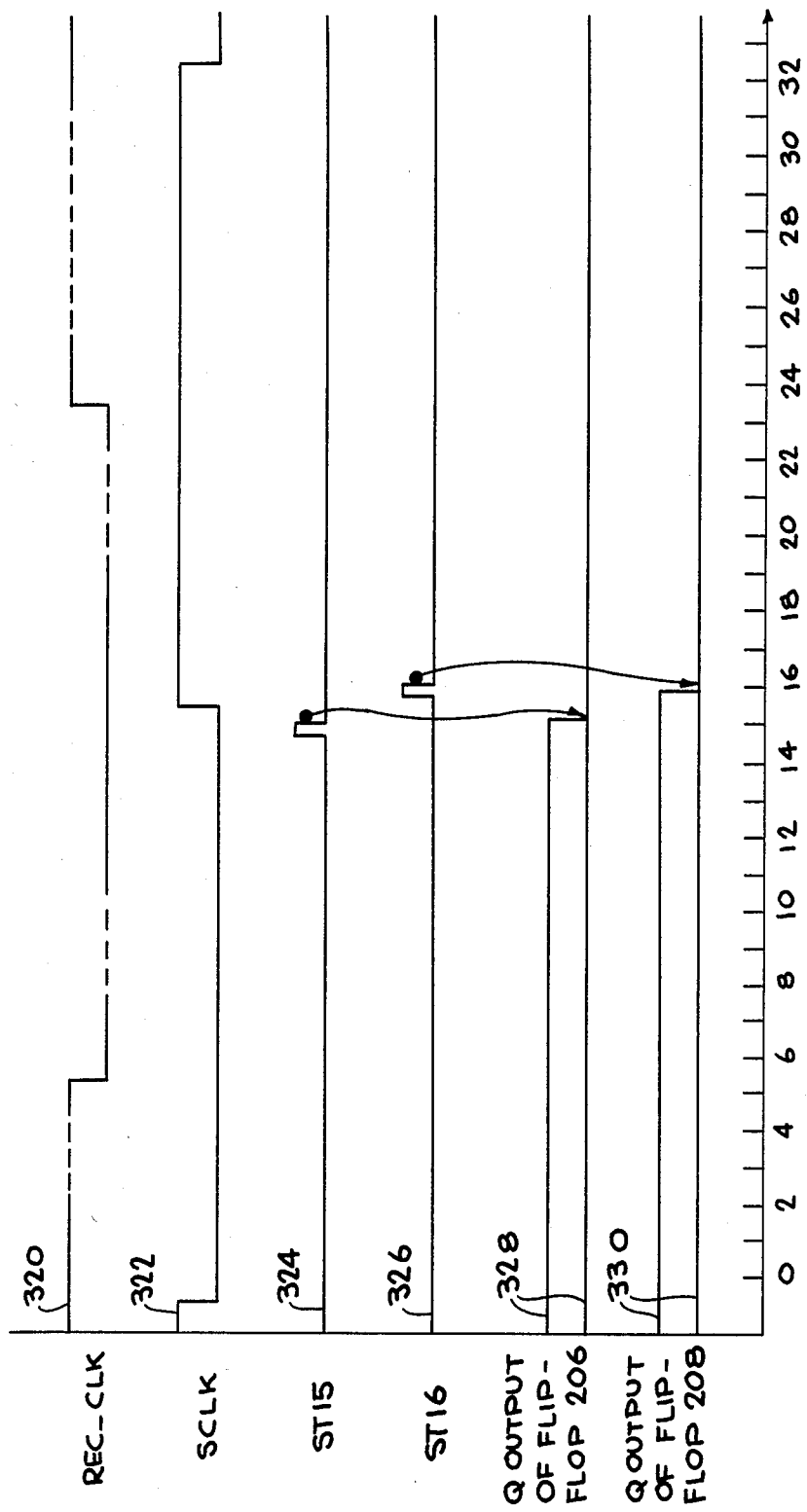
FIG. 3B is a timing diagram showing a phase relationship between the received clock and the serial port clock which causes generation of a SLOW adjustment signal.

As shown in FIG. 3B, if the REC_CLK signal waveform 320 is out of phase and behind the SCLK signal waveform 322, as shown in FIG. 3B, flip-flops 206 and 208 would both generate LOWs. During time interval 15, flip-flop 206 receives the ST15 clock signal waveform 324, from counter 220 and samples the REC_CLK signal, which is a LOW. Hence, the flip-flop 206 generates a LOW beginning with time interval 16, as shown in waveform 328. Similarly, flip-flop 208 receives the ST16 clock signal, waveform 326, from counter 220 during time interval 16, and samples the REC_CLK signal, which is a LOW. The flip-flop 208 generates a LOW begining with time interval 17, as shown in waveform 330. Since flip-flops 206 and 208 generate equal LOW signals in the case where the SCLK is advanced with respect to the REC_CLK, the AND gate 210 will generate a HIGH and the AND gate 212 will generate a LOW, for any interval during which the modulo-three counter 218 is generating a HIGH. Accordingly, the SLOW signal generated by flip-flop 210 will be a HIGH and the FAST signal generated by flip-flop 212 will be a LOW, when SCLK is ahead of REC_CLK. The divide-by-33 input to counter 220 will be activated and the counter 220 will operate in a divide-by-33 mode during the remainder of the interval illustrated in FIG. 3B. Thus, the SCLK waveform 322 will not be returned to the LOW level until the 33rd time interval as shown in FIG. 3B. The resulting one time interval delay will place the SCLK signal waveform closer to the proper phase relationship of the REC_CLK signal beginning with the next clock cycle starting with interval 33, as shown in FIG. 3B.

Figure 3C:
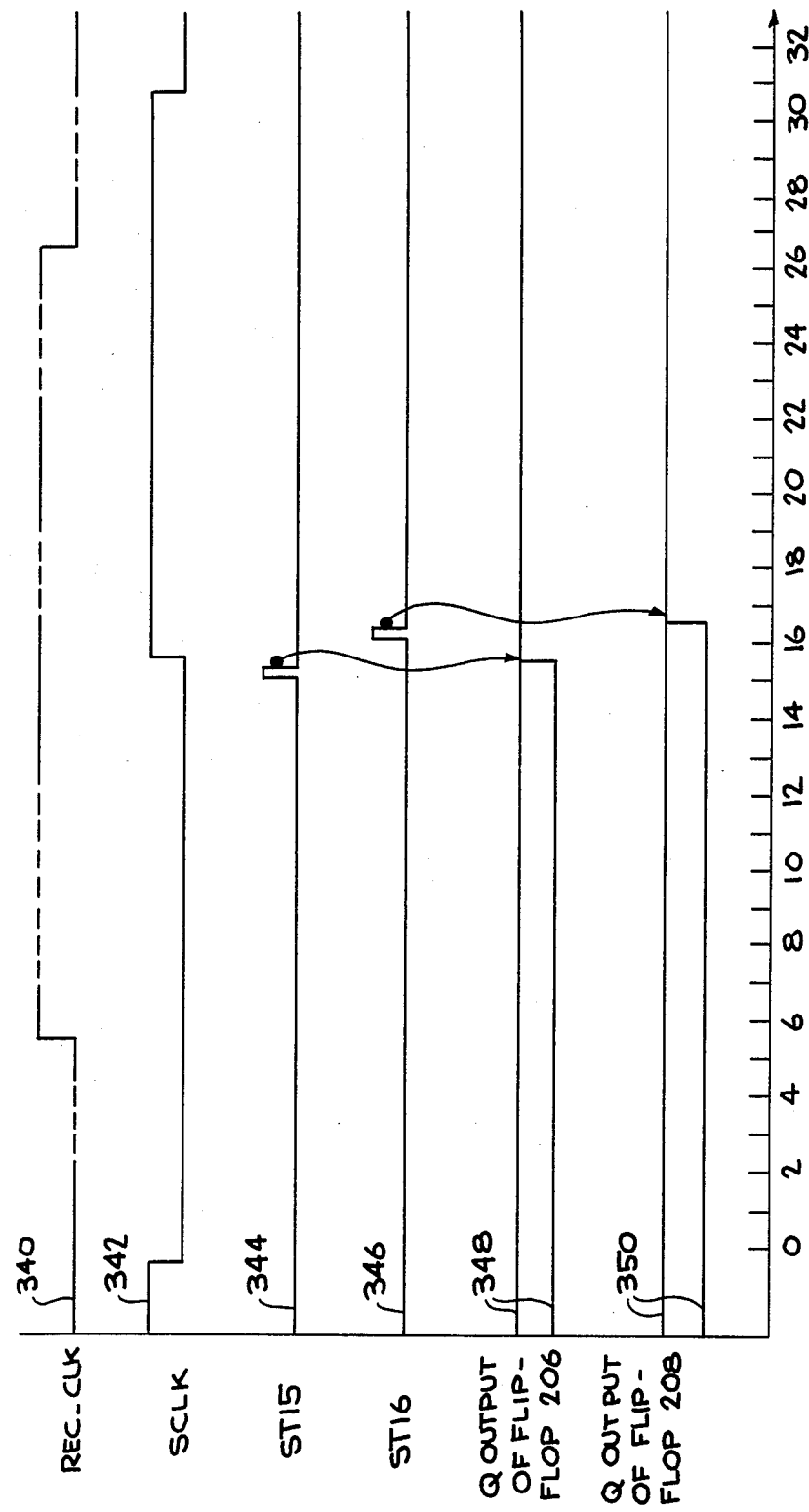
FIG. 3C is a timing diagram showing a phase relationship between the received clock and the serial port clock which causes generation of a FAST adjustment signal.

Conversely, if as shown in FIG. 3C, the REC_CLK signal, waveform 340 is out of phase and ahead of the SCLK waveform 342, flip-flops 206 will both generate HIGHs. During time interval 15, flip-flop 206 receives the ST15 clock signal, waveform 344, from counter 220 and samples the REC_CLK signal, which is a LOW. Hence the flip-flop 206 generates a HIGH beginning with time interval 16, as shown in waveform 348. Similarly, flip-flop 208 receives the ST16 clock signal, waveform 346, from counter 220 during time interval 16, and samples the REC_CLK signal, which is a HIGH. The flip-flop 208 generates a HIGH beginning with time interval 17, as shown in waveform 350. Since flip-flops 206 and 208 both generate HIGH signals, respectively, when the SCLK is delayed with respect to the REC_CLK, AND gate 210 will generate a LOW SLOW signal and AND gate 212 will generate a HIGH FAST signal, for any interval during which the modulo-three counter 218 is generating a HIGH. Accordingly, the divide-by-31 input to counter 220 will be activated and the counter 220 will operate in a divide-by-31 mode during the remainder of the interval illustrated in FIG. 3C. Thus the SCLK waveform 342 will be returned to the LOW level at the 31st time interval as shown in FIG. 3C. The resulting one time interval advance will place the SCLK signal waveform closer to the proper phase relationship of the REC_CLK signal beginning with the next clock cycle starting with interval 31, as shown in FIG. 3C.

The operation of the serial port synchronizer of the instant invention, as described above in connection with FIGS. 3B and 3C, will produce at most one phase adjustment for every three periods of the SCLK clock signal because of the presence of the modulo-three counter 218 in the circuitry leading from the SCLK generator, counter 220, via AND gate 216 to true input terminals of AND gates 210 and 212. In the worst case, where, for example, the SCLK signal leads by one-half of a SCLK clock period the REC_CLK signal, as in FIG. 3B, the generation of 16 SLOW adjustment signals would be required to resynchronize the SCLK clock. Since, in this case, one phase adjustment would occur for every three SCLK clock period, at most 48 SCLK clock periods (250 microseconds) are required to phase-lock the SCLK signal to the REC—CLk signal, after the LIU 110 enters either the F6 or F7 state.

We claim:

1. Apparatus for generating a series of clock signals responsive to a received clock signal having a predetermined frequency, a master clock signal and a line activity signal wherein said master clock signal is adjusted for synchronization with said received clock signal in the presence of said line activity signal and wherein said generated clock signal is free-running at said predetermined frequency in the absence of said line activity signal, comprising:

means responsive to said received clock signal and to a plurality of sample enable enables for sampling and holding said received clock signal upon reception of said sample enable signals and for generating a plurality of sampled received clock signals;

means responsive to said line activity signal, to said generated clock signal, and to said plurality of sampled received clock signals for generating a plurality of signals indicative of the relative phase relationship between said received and said generated clock signals, in the presence of said line activity signal; and phase adjustment means responsive to said relative phase relationship signals and to said master clock signals for generating said generated clock signal synchronous with, or respectively advanced, retarded, by one master clock period with respect to the most-recently generated clock signal in said series according to whether said relative phase relationship signals indicate synchronization with, or respectively a lagging or a leading phase relationship, in the presence of said line activity signal, for generating said free-running clock signal in the absence of said line activity signal, and for generating said plurality of sample enable signals each bearing a predetermined phase relationship to said generated clock signal;

wherein said relative phase relationship signal generating means comprises:
- n-state counting means responsive to said generated clock signal for generating a decimated clock signal at predetermined nth transitions of said generated clock signal;
- first gate means responsive to said line activity signal and to said decimated clock signal for generating an adjust enable signal at said predetermined nth generated clock signal transitions; and
- second gate means responsive to said adjust enable signal and to said plurality of sampled received clock signals for generating said plurality of relative phase relationship signals upon reception of said adjust enable signal.

2. A synchronizing clock generator according to claim 1 wherein said sampling and holding means comprises:
- a first D-type flip-flop having a clock input terminal, receiving said received clock signal at a data input and generating a first of said sampled received clock signals upon reception at said clock input terminal of a first sample enable signal of said plurality of sample enable signals; and
- a second D-type flip-flop having a clock input terminal receiving said received clock signal at a data input and generating a second of said sampled received clock signals upon reception at said clock input terminal of a second sample enable signal of said plurality of sample enable signals.

3. A synchronizing clock generator according to claim 2 wherein said second gate means comprises:
- a first AND gate receiving at a first complemented input terminal said first sampled received clock signal, at a second complemented input terminal said second sampled received clock signal, and at a first true input terminal said adjust enable signal, and generating therefrom at an output terminal a first of said relative phase relationship signals; and
- a second AND gate receiving at a first true input terminal said first received clock signal sample at a second time input terminal said second received clock signal sample, and at a third time input terminal said adjust enable signal, and generating therefrom at an output terminal a second of said relative phase relationship signals.

4. Apparatus for generating a series of clock signals responsive to a received clock signal having a predetermined frequency, a master clock signal and a line activity signal wherein said master clock signal is adjusted for synchronization with said received clock signal in the presence of said line activity signal and wherein said generated clock signal is free-running at said predetermined frequency in the absence of said line activity signal, comprising:
- means responsive to said received clock signal and to a plurality of sample enable signals for sampling and holding said received clock signal upon reception of said sample enable signals and for generating a plurality of sampled received clock signals;
- means responsive to said line activity signal, to said generated clock signal, and to said plurality of sampled received clock signals for generating a plurality of signals indicative of the relative phase relationship between said received and said generated clock signals, in the presence of said line activity signal; and
- phase adjustment means responsive to said relative phase relationship signals and to said master clock signals for generating said generated clock signal synchronous with, or respectively advanced, retarded, by one master clock period with respect to the most-recently generated clock signal in said series according to whether said relative phase relationship signals indicate synchronization with, or respectively a lagging or leading phase relationship, in the presence of said line activity signal, for generating said free-running clock signal in the absence of said line activity signal, and for generating said plurality of sample enable signals each bearing a predetermined phase relationship to said generated clock signal;
- wherein said phase adjustment means is a variable-state counter operable in a plurality of modes including a nominal m-state counting mode, a fast $(m-1)$-state counting mode, and a slot $(m+1)$-state counting mode;
- whereby said counting mode is determined by said relative phase relationship signals, so that said generated clock signal is generated synchronously with, or respectively advanced, retarded upon reception of said phase relationship signal indicating synchronization with, or respectively said lagging or leading, causing operation of said variable-state counter in said nominal (m-state) mode, or respectively said fast $(m-1)$ state mode or said slow $(m+1)$ state mode; and
- whereby said sample enable signals include a first sample enable signal generated during a $(m/2)-1$ counting state of said variable-state counter and a second sample enable signal generated during a $(m/2)$ counting state.

5. A synchronizing clock generator according to claim 4 wherein the reception of said first and said second relative phase relationship signals will cause said variable-state counter to operate in said slow $(m+1)$-state and said fast $(m-1)$-state counting mode, respectively and the reception of neither of said first or second relative phase relationship signals causes said variable state counter to operate in said nominal m-state counting mode.

6. A method of generating a series of clock signals adjusted for synchronization with a received clock (REC_CLK) signal, said method employing a master clock having a predetermined period, wherein said generated clock signal period equals m of said master clock periods and comprising the steps of:
   (a) sampling and holding said received clock signal during the $(m/2)-1$ and the $m/2$ time intervals of said generated clock signal period;
   (b) determining the relative phase relationship between said sampled received clock signals and said generated clock signal based on the boolean equations $$\text{SLOW} = \overline{\text{REC\_CLK}(m/2-1)} \text{ AND } \overline{\text{REC\_CLK}(m/2)}$$
   $$\text{FAST} = \text{REC\_CLK}(m/2-1) \text{ AND REC CLK}(m/2); \text{ and}$$

(c) generating a clock signal synchronous with, respectively advanced, retarded, by one master clock period with respect to the most-recently generated clock signal according to whether said relative phase relationship determined in step (b) indicates synchronization with, or respectively, a lagging or a leading phase relationship based on whether SLOW and FAST are ZERO, SLOW is ONE, or respectively, FAST is ONE.

7. A method of generating a series of clock signals according to claim 6 wherein said received clock has a predetermined frequency, further calling for selectably generating said synchronized clock signals according to steps (a)–(c) or (d) generating a clock signal free-running at said predetermined frequency.

8. A method of generating a series of clock signals according to claim 7 wherein steps (a)–(c) are executed during every nth generation of said clock signal and step (d) is executed during all other generations of said clock signal.

9. A method of generating a series of synchronized clock signals according to claim 8 wherein $n=3$.

10. A method of generating a series of synchronized clocks signal according to claim 6 further calling for selectably generating said synchronized clock signals according to steps (a), (b) and (c) or (d) generating a clock signal free-running at a predetermined frequency wherein steps (a)–(c) are executed when said FAST or said SLOW is a ONE and step (d) is executed when said FAST and said SLOW is a ZERO.

* * * * *